United States Patent
Gupta et al.

(10) Patent No.: US 9,557,937 B2
(45) Date of Patent: Jan. 31, 2017

(54) SYSTEMS, METHODS, AND COMPUTER PROGRAM PRODUCTS IMPLEMENTING HYBRID FILE STRUCTURES FOR DATA STORAGE

(71) Applicant: NETAPP, INC., Sunnyvale, CA (US)

(72) Inventors: Mohit Gupta, San Jose, CA (US); Subramaniam Periyagaram, Campbell, CA (US); Vania N. Fang, Cupertino, CA (US); Robert English, Menlo Park, CA (US); Ram Kesavan, Sunnyvale, CA (US)

(73) Assignee: NETAPP, INC., Sunnyvale, CA (US)

( * ) Notice: Subject to any disclaimer, the term of this patent is extended or adjusted under 35 U.S.C. 154(b) by 116 days.

(21) Appl. No.: 13/972,620

(22) Filed: Aug. 21, 2013

(65) Prior Publication Data
US 2015/0058554 A1    Feb. 26, 2015

(51) Int. Cl.
*G06F 12/00*    (2006.01)
*G06F 3/06*    (2006.01)

(52) U.S. Cl.
CPC .......... *G06F 3/0685* (2013.01); *G06F 3/061* (2013.01); *G06F 3/065* (2013.01); *G06F 3/067* (2013.01); *G06F 3/0619* (2013.01); *G06F 3/0643* (2013.01)

(58) Field of Classification Search
None
See application file for complete search history.

(56) References Cited

U.S. PATENT DOCUMENTS

| | | | |
|---|---|---|---|
| 5,758,360 A | 5/1998 | Zbikowski et al. | |
| 6,535,869 B1 | 3/2003 | Housel, III | |
| 7,072,916 B1 | 7/2006 | Lewis et al. | |
| 2010/0228781 A1* | 9/2010 | Fowler | G06T 11/40 707/791 |
| 2012/0278382 A1 | 11/2012 | Faith et al. | |
| 2012/0330903 A1* | 12/2012 | Periyagaram | G06F 3/0608 707/692 |

(Continued)

OTHER PUBLICATIONS

PCT—International Searching Authority, Notification of Transmittal of the International Search Report and the Written Opinion of the International Searching Authority or the Declaration mailed Oct. 30, 2014, Application No. PCT/US2014/051304, 9 pages, Alexandria, Virginia.

(Continued)

*Primary Examiner* — Baboucarr Faal
(74) *Attorney, Agent, or Firm* — Nixon Peabody LLP; Khaled Shami (57) ABSTRACT

Systems, methods, and computer program products implementing hybrid file structures for data storage are provided. One embodiment of a method performed in a computer-based storage system includes writing a file as data blocks in an array of storage devices. The method includes associating the data blocks with metadata related to at least one location in the array of storage devices for later access to the data blocks. The file is represented as a hierarchical data structure having a plurality of nodes. A first portion of nodes has a first span type, and a second portion of nodes has a second span type. The data structure includes a buftree. The first span type includes a fixed-span type. The second span type includes a variable-span type.

20 Claims, 3 Drawing Sheets

(56) References Cited

U.S. PATENT DOCUMENTS

2013/0054927 A1* 2/2013 Raj ................. G06F 3/0608
          711/170

OTHER PUBLICATIONS

Kristen Lefevre, http://web.eecs.umich.edu/~klefevre/eecs484/Handouts/lec14.pdf, B+ Tree Indexes, Mar. 8, 2011, 14 pages.
Written Opinion of the International Searching Authority and International Preliminary Report on Patentability, dated Feb. 23, 2016, issued in International Patent Application No. PCT/US2014/051304, 6 pages.

* cited by examiner

SYSTEMS, METHODS, AND COMPUTER PROGRAM PRODUCTS IMPLEMENTING HYBRID FILE STRUCTURES FOR DATA STORAGE

TECHNICAL FIELD

The present description relates, generally, to computer data storage systems and, more specifically, a hybrid file structure using a combination of fixed-width and variable-width nodes in computer data storage systems.

BACKGROUND

In a computer data storage system which provides data storage and retrieval services, an example of a copy-on-write file system is a Write Anywhere File Layout (WAFL™) file system available from NetApp, Inc. The data storage system may implement a storage operating system to functionally organize network and data access services of the system, and implement the file system to organize data being stored and retrieved. Contrasted with a write-in-place file system, a copy-on-write file system writes new data to a new block in a new location, leaving the older version of the data in place (at least for a time). In this manner, a copy-on-write file system has the concept of data versions built in, and old versions of data can be saved quite conveniently.

Some data structures used to represent files in a file system may not allow for optimal efficiency in conducting parallel operations on a file (e.g., read, write, insert, delete, etc.). For example, performing one operation on one part of the file may prevent other operations from being performed on a different part of the file. Some data structures used to represent files may include an excess of metadata associated with a file (e.g., a high metadata to data ratio). Real world data storage systems are limited by available space. Thus, it may be better to represent files in a file system using data structures that allow for more optimal efficiency in conducting parallel operations and for a more optimal metadata to data ratio.

BRIEF DESCRIPTION OF THE DRAWINGS

The present disclosure is best understood from the following detailed description when read with the accompanying figures.

DETAILED DESCRIPTION

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

In one or more aspects of the present disclosure, systems, methods, and computer program products implementing hybrid file structures for data storage are shown and described. In one example, a method includes writing a file to an array of storage drives and representing the file as a buftree including both fixed-width nodes and variable-width nodes. In some embodiments, intermediate storage blocks at and above a reference level are represented as fixed-width nodes. In some embodiments, intermediate storage blocks below the reference level are represented as variable-width nodes. Representing a file partially as fixed-width nodes allows for, among other things, more optimal efficiency in performing parallel operations, while representing the file partially as variable-width nodes allows for, among other things, a more optimal metadata to data ratio.

It is understood that various embodiments may be implemented in a Network Attached Storage (NAS), a Storage Area Network (SAN), or any other network storage configuration. Further, some embodiments may be implemented using a single physical or virtual storage drive or using multiple physical or virtual storage drives (e.g., one or more Redundant Arrays of Independent Disks (RAIDs)). Various embodiments are not limited by the particular architecture of the computer-based storage system. Furthermore, the following examples refer to some items that are specific to the WAFL™ file system, and it is understood that the concepts introduced herein are not limited to the WAFL™ file system but are instead generally applicable to various copy-in-place file systems now known or later developed.

When a file is stored in a storage drive, its contents are written to a physical location on a storage drive. When a user later accesses the file, the contents are retrieved from the physical location. Along with the contents of the file, metadata associated with the file is also written to the storage drive. The metadata describes, among other things, the location on the storage drive where the contents are written. The storage drive is logically divided into data blocks. Thus the contents and metadata of the file may be written in one or more data blocks. Groupings of data blocks are referred to as extents. For example, a 64 KB extent may be a grouping of 16 4 KB data blocks.

Knowing where the file contents and metadata are stored allows for later access to a file. To facilitate this access, contents and metadata of a file are structured as a "buftree" or a directed acyclic graph (DAG). The buftree may be described as a collection of data blocks (i.e., locations of data). The buftree may also be described as a mapping of the contents and metadata associated with a file. Access to a file's contents is had by following a "tree" from its root to its leaves. The file contents are stored in the leaves or in L0 data blocks. Various levels of metadata are stored between the L0 data blocks and the root or inode of the buftree. These levels include data blocks that are referred to as L1, L2, etc., or collectively, intermediate storage blocks. Data blocks may variously be referred to as nodes (e.g., an internal node describes a node that has at least one internal node or leaf node as its children, and a leaf node describes a node that has no other nodes as children). The root or inode of the buftree stores certain metadata associated with the file. The inode points to 'n' intermediate blocks; each intermediate block in turn points to 'm' intermediate blocks, and eventually intermediate blocks point to L0 blocks.

Buftrees may be represented "in core" and "on disk." The in core representation refers to the buftree in a memory of, e.g., a storage server configured to carry out one or more processes associated with reading, writing, and other operations on data stored in a persistent storage. The on disk representation refers to the collection of data blocks in the persistent storage.

An indexing scheme may be used to organize the file contents and metadata. The indexing scheme may facilitate access to the file contents by defining the metadata stored in the data blocks and the relationship between data blocks. One aspect of indexing schemes is the span or range of file block numbers associated with the data blocks. In that regard, data blocks may be described as having a particular span type. For example, data blocks may be fixed-width or variable-width. Fixed-span and variable-span may be used interchangeably with fixed-width and variable-width, respectively. Fixed-width or fixed-span may be described as a first span type, and variable-width or variable-span may be described as a second span type.

A file block number is a number that indexes a data block within a particular file. A given file may point to multiple data blocks, and a block may be associated with multiple files. For instance, if a particular file is associated with two underlying data blocks, one data block may have the file block number 0 and the other may have the file block number 1. Fixed-width blocks, at each level of the tree, include a fixed number of FBNs indexed by each data block. Variable-width blocks may map a different number of FBNs within each level of the tree, depending, e.g., on the extent size used in the particular section of the file being indexed. For example, buftrees currently used in the WAFL™ file system include fixed-width nodes, whereas B+ trees include variable-width nodes. Each buftree may be a mapping from one or more FBNs to some metadata referred to as a payload. The metadata may describe, among other things, a location of the file's contents (e.g., a virtual location in a file system and/or a physical location in a storage drive). Each FBN may be associated with a portion of a file's contents. For trees with fixed-width nodes, the payload may be a (virtual volume block number or VVBN, physical volume block number or PVBN) pair. VVBN is an index of a particular block within a storage volume. For instance, if the storage volume includes one thousand data blocks, the blocks may be numbered 0 to 999, each block having its own virtual volume block number. The PVBN is an index of a particular block on disk, indicating a location inside a particular drive where the block resides. For example, in a storage array with "k" drives with "n" blocks being allocated per drive, there is a total of k×n blocks that may be allocated. Each block may be numbered from 0 to (k×n)−1, each block having its own physical volume block number. For trees with variable-width nodes, the payload may be a (FBN, ExtentID, Length) tuple. ExtentID may be an index of grouping data blocks. The (VVBN, PVBN) pair and ExtentID describe locations where the file's contents are stored.

Referring to again to trees with fixed-width nodes, for example, an L1 block in a 64-bit aggregate has 255 entries, each of which may contain 255 FBNs that refer to 255 (VVBN, PVBN) pairs. 64 bit may refer to the addressing scheme used to address disk space (e.g., 4K data blocks). Each data block in a 64 bit addressing scheme is associated with a 64 bit address. The aggregate may refer to a disk space or a set of data blocks within the address space associated with the addressing scheme (e.g., those data blocks uniquely addressed by the addressing scheme). Moving up a level in the tree, each L2 block may also have 255 entries, each of which contain a (VVBN, PVBN) pair that refers to a single L1. Each entry in the L2 therefore maps 255 FBNs, and the exact FBNs mapped may be computable, known, and unchanging. Referring again to trees with variable-width nodes, for example, if a section of the file uses 4 KB extents, then the leaf node for that section will map 255 FBNs to (FBN, ExtentID, Length) tuples (similar to using fixed-width nodes). If that section of the file is using 64 KB extents (sixteen times as large), then the leaf node for that section will map 4080 FBNs to (FBN, ExtentID, Length) tuples, sixteen times as many FBNs compared to the fixed-width example.

In one or more aspects of the present disclosure, a hybrid tree including fixed-width and variable-width nodes is described. According to one or more aspects of the present disclosure, in the hybrid tree, the intermediate blocks at a particular level (e.g., level 2) and above have fixed-widths on disk and in core. The intermediate blocks at levels below that particular level (e.g., level 1) have a fixed width in core and a variable width on disk. The particular level may be referred to in the discussion herein as a reference level. While level 2 is specifically mentioned as the reference level, in various embodiments, any level at level 2 or above may be used. For example, when level 4 is used as the reference level, levels 4 and above have fixed widths in core and on disk while levels 1, 2, and 3 have fixed widths in core and variable-width on disk.

The hybrid tree may be an alternative to a tree with only fixed-width nodes or only variable-width nodes at all levels. In some exemplary aspects, the on disk representation of the hybrid tree resembles a tree with fixed-width nodes: the L2 and higher intermediate blocks may have fixed-width; and the entries in an L2 block may point to an L1 block as if the L1 block covered only 255 4 KB blocks. The hybrid tree also resembles a tree with variable-width nodes in some exemplary aspects: all L1 intermediate blocks may have variable-width on disk, with sorted entries of pointers to variable-length extents; and the payload may be a (FBN, ExtentID, Length) tuple. FBN may be described as a first identifier related to a data block of a file. ExtentID may be described as a second identifier related a grouping of data blocks.

According to one or more aspects of the present disclosure, the hybrid tree advantageously allows for the benefits of both fixed-width nodes and variable-width nodes to be realized. The hybrid tree structure may be advantageously implemented in systems already implementing, e.g., fixed-width trees by adding certain features of variable-width trees without the time and expense associated with reconstructing a file system architecture from scratch or implementing an entirely different file system architecture. By using fixed-width nodes, the hybrid tree may advantageously allow for more optimal efficiency in performing parallel operations (e.g., lower locking costs) on a file compared to variable-width trees. For example, using fixed-width nodes provides the ability to be able to safely, statically partition the tree for simultaneous tree access with minimal locking contention. By using variable-width nodes, the hybrid tree may advantageously allow for more optimal (e.g., lower) metadata to data ratio to represent files. In addition, using variable-width nodes advantageously provides the ability to address variable size extents within the file.

Figure 1:
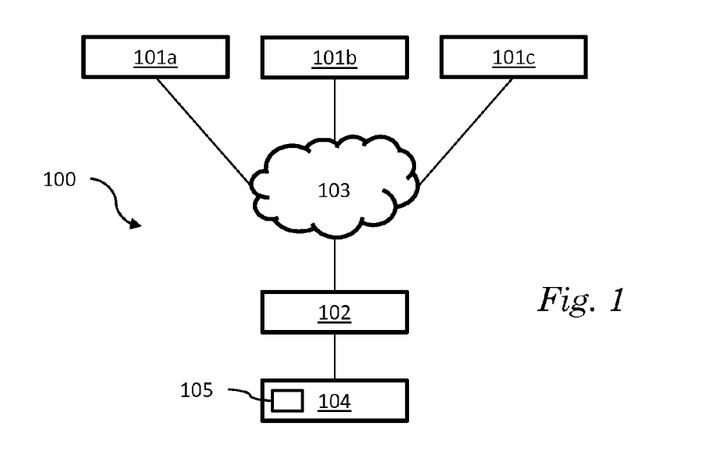
FIG. 1 is a block diagram of an exemplary network storage system, according to one embodiment.

Referring to FIG. 1, a block diagram of an exemplary network storage system 100 is shown, according to one embodiment. Network storage system 100 may implement a storage operating system in which various embodiments of the hybrid tree discussed herein may be executed. Storage server 102 is coupled to a persistent storage subsystem 104 and to a set of clients 101 through a network 103. The network 103 may include, for example, a local area network (LAN), wide area network (WAN), the Internet, a Fibre Channel fabric, or any combination of such interconnects. Each of the clients 101 may include, for example, a personal computer (PC), server computer, a workstation, handheld computing/communication device or tablet, and/or the like. FIG. 1 shows three clients 101a-c, but the scope of embodiments can include any appropriate number of clients.

One or more of clients 101 may act as a management station in some embodiments. Such client may include management application software that is used by a network administrator to configure storage server 102, to provision storage in persistent storage 104, and to perform other management functions related to the storage network, such as scheduling backups, setting user access rights, and the like.

The storage server 102 manages the storage of data in the persistent storage subsystem 104. The storage server 102 handles read and write requests from the clients 101, where the requests are directed to data stored in, or to be stored in, persistent storage subsystem 104. Persistent storage subsystem 104 is not limited to any particular storage technology and can use any storage technology now known or later developed. For example, persistent storage subsystem 104 has a number of nonvolatile mass storage devices, which may include conventional magnetic or optical disks or tape drives; non-volatile solid-state memory, such as flash memory; or any combination thereof. In one particular example, the persistent storage subsystem 104 may include one or more RAIDs.

The storage server 102 may allow data access according to any appropriate protocol or storage environment configuration. In one example, storage server 102 provides file-level data access services to clients 101, as is conventionally performed in a NAS environment. In another example, storage server 102 provides block-level data access services, as is conventionally performed in a SAN environment. In yet another example, storage server 102 provides both file-level and block-level data access services to clients 101.

Persistent storage 104 includes storage controller 105. The storage controller 105 may be, e.g., a RAID controller or cluster of RAID controllers that runs a storage operating system, such as Data ONTAP™ available from NetApp, Inc. The storage operating system performs low-level management of the operations of the storage drives to provide virtualized storage. Server 102 may be a commodity server, such as a Unix server, that runs applications that interact with storage controller 105 to read and write data to persistent storage 104. Storage controller 105 and the storage operating system may be configured to implement the hybrid tree structure described herein. Storage controller 105 may include a processing circuit including one or more processors and a memory to perform one or more of the actions described herein.

System 100 is shown as an example only. Other types of hardware and software configurations may be adapted for use according to the features described herein.

Figure 2:
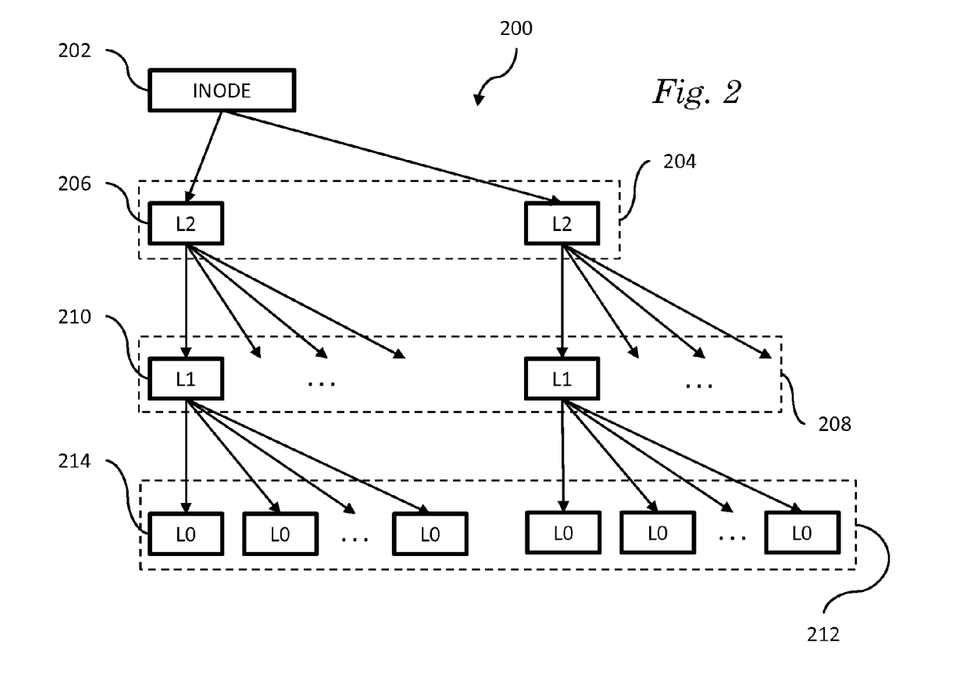
FIG. 2 is an illustration of an exemplary file, according to one embodiment.

Referring to FIG. 2, an illustration of an exemplary file 200 is shown, according to one embodiment. FIG. 2 may be an on disk representation of file 200. In this example, file 200 is a hybrid file described herein and may be implemented by the storage operating system of system 100 (FIG. 1). File 200 includes a logical structure organizing data to be stored and/or retrieved, and file 200 is one example. The storage operating system carries out the operations of a storage system (e.g., system 100 of FIG. 1) to save and/or retrieve data within file 200. According to one embodiment, file 200 includes an inode 202, intermediate data storage blocks 204, 208 (described below), and lower level data storage blocks 212 (also described below).

File 200 may be one file out of many files that are present in a file system. It is understood that a file system may include other data structures not shown in FIG. 2. The file system may refer to, e.g., an active file system (AFS). For example, at the top level of the file system may be a vol info block. The vol info block may include data about the volume including the size of the volume, volume level options, language, etc. The file system may also include fs info block(s). Mode file 202 may be described by the fs info block, which may act a special root inode for the AFS. The fs info block may capture the states used for snapshots (e.g., a copy of a file system at a particular time), such as the locations of files and directories in the file system. The AFS may also include an active map. The active map may be a file that includes a bitmap associated with the vacancy of blocks of the active file system. In other words, the active map may indicate which of the data storage blocks are used (or not used) by the AFS. For example, a particular position in the active map may correspond to a data storage block, and a 1 or a 0 in the position may indicate whether the data storage block is used by the AFS. A data storage block includes a specific allocation area on persistent storage 104. In one specific example, the allocation area may be a collection of sectors, such as 8 sectors or 4,096 bytes, commonly called 4 KB on a hard disk, though the scope of embodiments described herein is not limited to hard disks only. A file block includes a standard size block of data including some or all of the data in a file. In an example embodiment, the file block is the same size as a data storage block. The active map provides an indication of which of the data storage blocks are used by a file block of the AFS. The AFS may also include a block type map, which provides an indication as to the type of data in a data storage block.

Returning to FIG. 2, inode 202 includes data structures with information about files in Unix and other file systems. Each file has an inode and is identified by an inode number (i-number) in the file system where it resides. Inodes provide important information on files such as user and group ownership, access mode (read, write, execute permissions) and type. An inode points to the file blocks or intermediate blocks of the file it represents. Inode file 202 describes which blocks are used by each file, including metafiles.

File 200 is arranged hierarchically. In FIG. 2, inode 202 is on the top level (though, as described above, when file 200 is described in a file system, a vol info block or an fs info block is higher than inode 202). The hierarchy includes further components at lower levels. At the lowest level, referred to herein as L0, are data blocks 212, which include user data as well as some lower-level metadata. Between inode file 202 and data blocks 212, there may be one or more levels of intermediate storage blocks 204, 208. FIG. 2 shows two levels of intermediate storage blocks 204, 208, it is understood that a given embodiment may include more than one or more than two hierarchical levels of intermediate storage blocks, which by virtue of pointers eventually lead to L0 data blocks 212.

The example of FIG. 2 describes an exemplary 508 MB file, with a span of 255 4 KB blocks and 64 KB extents, though the scope of embodiments includes any sized file, span, and extents. In other embodiments, the file size, span, and extent size may be different. The exemplary file may be stored using 50% hybrid tree utilization, though the scope of embodiments includes any utilization percentage. In this embodiment, the utilization percentage refers to a measure of how densely populated the file is on disk. That is, utilization percentage is measure of the free space or sparseness between extents of data in a file on a storage drive. A higher utilization percentage indicates a more densely written storage drive (e.g., less free space) and vice versa. The utilization percentage may affect the number of metadata blocks that are needed to address the extents of a file. For example, a file with "n" extents that are laid out in a consecutive fashion (e.g., densely written disk, without free space between extents, and/or 100% utilization), the number of metadata blocks needed may be "k1". If the same file with "n" extents is more sparsely written (e.g., with free space between extents and/or less than 100% utilization), the number of metadata blocks may be k1+k2, where k2 is some positive number that may or may not be on the order of k1. Regardless, with a lower utilization percentage (e.g., more sparseness and/or free space between extents), a greater number of metadata blocks is used to address the file extents. This is because the additional metadata is employed to account for the free space between the file extents.

The buftree for the 508 MB file of this example includes two L2 blocks and sixty-four L1 blocks. L2 blocks are collectively labeled 204. L1 blocks are collectively labeled 208. Inode 202 points to each of the L2 blocks 204. In the hybrid file system, the L2 blocks may be fixed-width on disk. Each L2 block, e.g., L2 block 206, points to 32 different L1 blocks 208. In the hybrid file system, the L1 blocks may be variable-width on disk. Thus, the L1 blocks may map a different number of FBNs, depending, e.g., on the extent size used for the particular section of the file being indexed. In the example discussed in FIG. 2, the same extent size is used for the entirety of the file. (In other embodiments, different portions of the file may use different extent sizes.) Each L1 block, e.g., L1 block 210, points to 2032 L0 blocks 212. L0 block 214 refers to one L0 block. With 64 KB extents, the 2032 L0 blocks are stored as 127 sixteen-block extents. Thus, e.g., L1 block 210 points to 127 sixteen-block extents. There are a total of 130050 L0 data blocks. With 64 KB extents, the L0 data blocks may be stored as 8128 sixteen-block extents and one two-block extent.

Figure 3:
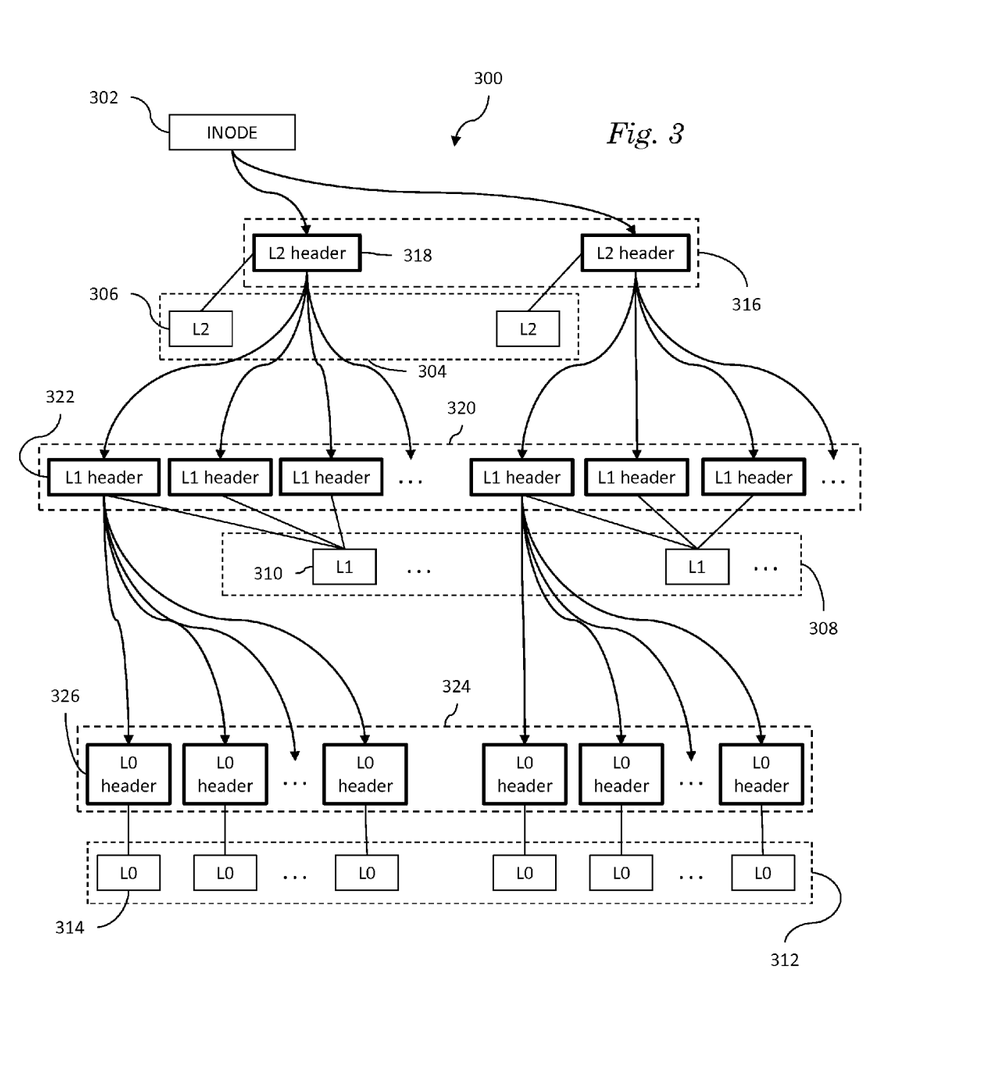
FIG. 3 is an illustration of an exemplary file, according to one embodiment.

Referring to FIG. 3, an illustration of an exemplary file 300 is shown, according to one embodiment. FIG. 3 is an in core representation of the example file 200 (FIG. 2). In general, the in-core buffer tree is shown to include buffer headers, which are data structures in memory that represent corresponding data blocks in persistent storage. Thus, inode 302 is pointing to L2 buffer headers 316, which are pointing to L1 buffer headers 320, which are pointing to L0 buffer headers 324 (curved lines in FIG. 3).

According to one embodiment, the hybrid tree structure has fixed-width buffer headers in core for each of the intermediate storage blocks. This includes the L1 blocks, which are variable-width on disk, as discussed above with respect to FIG. 2. L2 buffer headers 316 and L0 buffer headers 324 are shown to have one-to-one correspondence (straight lines in FIG. 3) with L2 blocks 304 and L0 blocks 312, respectively. According to one embodiment, L1 buffer headers share on disk L1 metadata. Multiple L1 buffer headers 320 are shown to correspond to a single L1 block 308 (straight lines in FIG. 3). The hybrid tree structure may have the same in core memory footprint as a tree with variable-width nodes so that the metadata sharing may be implemented by the storage operating system. Multiple buffer headers thus advantageously share one block. In FIG. 3, this is shown by, e.g., L1 block 310 corresponding to multiple L1 buffer headers 320 (including L1 buffer header 322).

As with FIG. 2, FIG. 3 describes an exemplary 508 MB file, with a span of 255 4 KB blocks and 64 KB extents. The exemplary file may be stored using 50% hybrid tree utilization. As discussed above, the scope of embodiments includes any sized file, span, extents, and/or utilization percentage. In different embodiments, the file size, span, extent size, and/or utilization percentage may be different.

FIG. 3 is an illustration of file 300 in core, including an inode 302 and pointers that eventually lead to L0 buffer headers 324 by way of intermediate L2 buffer headers 316 and intermediate L1 buffer headers 320. As described with respect to file system 200 (FIG. 2), the buftree for the 508 MB file may include two L2 blocks and sixty-four L1 blocks on disk. In core, inode 302 points to two L2 buffer headers 316. Each L2 buffer header, e.g., L2 buffer header 318, is associated with an L2 data block 306 and vice versa. In this example, there is a total of two L2 buffer headers 316 and a total of two fixed-width L2 data blocks 304, though the scope of embodiments is not so limited. Each L2 buffer header, e.g., L2 buffer header 318, points to 255 L1 buffer headers 320. Thus, there is a total of 510 L1 buffer headers 320. Each L1 buffer header, e.g., L1 buffer header 322, is associated with one L1 data block 310. Each L1 data block 310 is associated with one or more L1 buffer headers 322. There may be a total of 64 variable-width L1 data blocks (less than the number of L1 buffer headers 320, because multiple L1 buffer headers 320 correspond to a single L1 data block 310). Each L1 buffer header, e.g., L1 buffer header 322, points to 255 L0 buffer headers 324. Each L0 buffer header, e.g., L0 buffer header 326, is associated with one L0 data block 314. Thus, there are a total of 130050 L0 buffer headers 324 and 130050 L0 data blocks 312. As described with respect to file system 200 (FIG. 2), with 64 KB extents, the L0 data blocks are stored as 8128 sixteen-block extents and one two-block extent.

Figure 4:
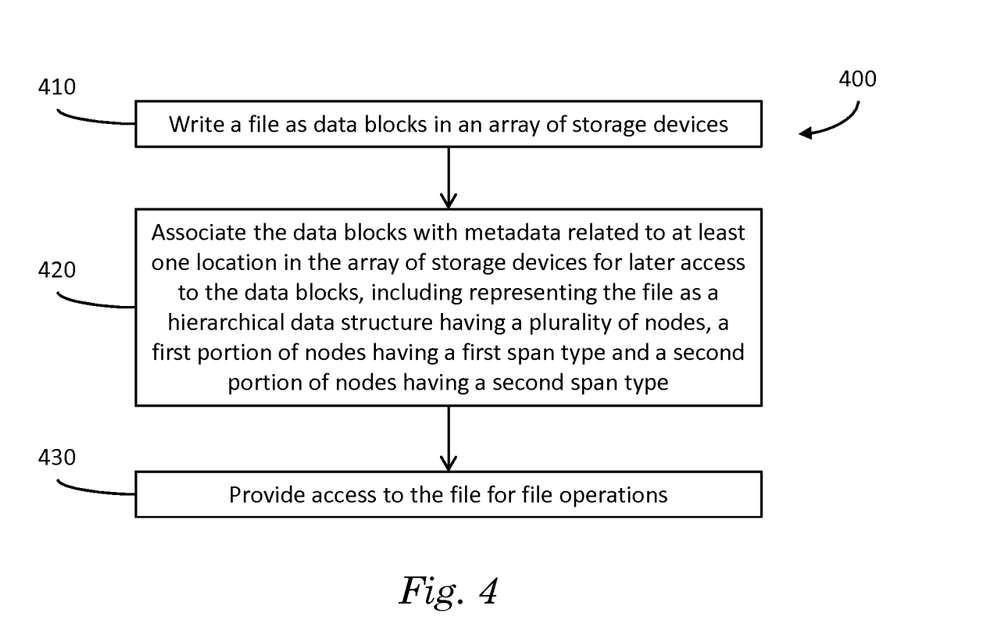
FIG. 4 is a flow diagram of a process for saving a file in a computer-based storage system, according to one embodiment.

Referring to FIG. 4, a flow diagram of a process 400 for saving a file in a computer-based storage system is shown, according to one embodiment. Process 400 may be performed, e.g., by storage controller 105 of FIG. 1 (which implements the storage operating system) when carrying out the actions described above with respect to FIGS. 2 and 3. In particular, storage controller 105 may include a processing circuit, a memory, and at least one processor for performing one or more actions when it processes computer-readable code stored to the memory. In executing such code, the one or more processors may perform the actions described below.

Process 400 includes action 410, at which a file is written as data blocks in an array of storage devices.

Process 400 includes action 420, at which the data blocks are associated with metadata related to at least one location in the array of storage devices for later access to the data blocks. The metadata may include file information relating to the data blocks such as a physical location of the data blocks in an array of storage drives, a virtual location in a file system, permissions associated with the file, etc.

Associating the data blocks with at least one location includes representing the file as a data structure including a plurality of nodes. The data structure includes a buftree. Associating the data blocks with at least one location may facilitate later access to the file for, e.g., read, write, and other operations. Various components of the file may be stored in different locations. For example, the file contents may be disparately stored in various data blocks throughout the storage array, and the metadata associated with the file may be stored at different locations from the file contents.

A first portion of nodes of the data structure has a first span type. For example, nodes at or above a particular level (e.g., a reference level) in the data structure may be represented as fixed-width nodes. A second portion of nodes has a second span type. For example, nodes below the reference level in the data structure may be represented as variable-width nodes. According to one embodiment, in a representation of the data structure in the array of storage devices (e.g., an on disk representation), the first portion of nodes and the second portion of nodes include a fixed-width type. That is, in-core (e.g., in a representation of the data structure in a memory of the computer-based storage system), nodes at each of the levels of the data structure are represented as fixed-width nodes. According to one embodiment, in a representation of the data structure on disk, the first portion of nodes include a fixed-span type and the second portion of nodes includes a variable-span type. That is, on disk, nodes at or above the reference level are represented as fixed-width nodes while nodes below the reference level are represented as variable-width nodes. The first portion of nodes includes nodes at a reference level and levels above the reference level. The second portion of nodes includes nodes at levels below the reference level.

According to one embodiment, level two in the buftree is the reference level. The intermediate storage blocks at level two may reference at least one intermediate storage block at level one. The intermediate storage blocks at level one may reference at least one identifier related to a data block of the file (e.g., a file block number). Level zero includes the data blocks. Thus, for example, nodes or intermediate storage blocks at level two and above may be fixed-width in core and on disk, while nodes or intermediate storage blocks at level one are fixed-width in core and variable-width on disk. The first portion of nodes and the second portion of nodes are associated with a tuple of values describing at least one of a first identifier related to a data block of a file (e.g., a file block number or FBN), a second identifier related a grouping of data blocks (e.g., an ExtentID), and a length of the tuple.

Process 400 includes action 430, at which access is provided to the file for file operations. For example, file operations may include read, write, insert, delete, and other file operations. Access may be provided by a storage controller for client and server devices to access files stored in or directed to be stored in a persistent storage subsystem 104. According to one embodiment, access is provided to the file by traversing the data structure (e.g., the buftree) from a root or an inode to the leaves or L0 data blocks. The L0 data blocks may store the underlying data contents of the file. By contrast, the nodes between the inode and the L0 data blocks may store metadata (e.g., location of associated data in a storage drive or in a file system) that facilitates traversal of the data structure.

Embodiments of the present disclosure can take the form of a computer program product accessible from a tangible computer-usable or computer-readable medium providing program code for use by or in connection with a computer or any instruction execution system. For the purposes of this description, a tangible computer-usable or computer-readable medium can be any apparatus that can store the program for use by or in connection with the instruction execution system, apparatus, or device. The medium can be an electronic, magnetic, optical, electromagnetic, infrared, or a semiconductor system (or apparatus or device). In some embodiments, one or more processors (not shown) running in storage controller 105 (FIG. 1) execute code to implement the actions shown and/or described with respect to FIGS. 2, 3, and 4.

In one or more aspects of the present disclosure, a hybrid tree structure for representing a file in a file system includes a combination of fixed-width nodes and variable-width intermediate nodes. The intermediate nodes store metadata associated with the file. In an on disk representation of the hybrid tree, intermediate nodes at or above a reference level are represented as fixed-width nodes. Intermediate nodes below the reference level are represented as variable-width nodes. In an in core representation of the hybrid trees, all intermediate nodes are fixed-width.

Various embodiments may provide one or more advantages over conventional techniques. The hybrid tree format combines the benefits of fixed-width n-array trees and variable-width trees such as B+ trees. The hybrid tree structure may be an alternative to, e.g., trees with all fixed-with nodes or trees with all variable-width nodes (e.g., full-fledged B+ trees). Among other things, the use of fixed-width intermediate blocks for part of the tree advantageously preserves the ability to use a lock-free or lock-less, parallel access architecture for multiple processing. The parallel access architecture divides data in such a way that the data can be accessed in parallel in a lock-free manner. That is, multiple processes are allowed to access the different regions of a file's metadata at the same time. For example, in an insert operation when data is being added to a file, the file's metadata is also modified. Some other tree structures (e.g., B+ trees) require that the metadata be locked when metadata operations associated with, e.g., the insert operation are being carried out on a particular metadata node. This prevents other operations that affect that particular node, e.g., a delete operation to remove data from a file, from being performed because the delete operation also has metadata operations that act on that particular node. Because the metadata is locked by the first process (e.g., the insert operation), the second operation (e.g., the delete operation) cannot be carried out in parallel. The operations must be carried out in a less efficient, serial manner in the B+ tree example. Using fixed-width nodes advantageously allows for parallel metadata operations to be carried out on the same node because the metadata operations do not access the same metadata of fixed-width nodes. That is, a thread working on part of a tree is allowed to have exclusive access to some of the data contained in that part. This advantageously allow for multiple file operations (e.g., insert, delete, etc.) to be carried out in a more efficient, parallel fashion. Thus, the hybrid tree advantageously provides the storage efficiency of a B+ tree, while still allowing parallel access data protection between threads. In other words, using fixed-width intermediate blocks provides the ability to be able to safely (statically) partition the hybrid tree for simultaneous tree access with minimal locking contention.

Using fixed-width intermediate blocks for part of the tree also advantageously preserves the ability to use the existing buffer hash for block lookup. The buffer hash may be implemented using a hash created based on a certain key. The key has a FBN and tree level associated with it. For a fixed-width tree, the FBN and level are fixed for a particular buffer. This advantageously makes it possible to look up the particular buffer or node in a hash table using a FBN and level. This also makes it possible to look up data by searching the metadata from a bottom level to a top level. Because the FBNs are fixed, if the data that is being searched for is found in the hash, the key required to look up the data is known. By contrast, for some other tree structures (e.g., B+ tree), the FBNs are not fixed because the nodes are variable-width. Thus, there is no key to look up the metadata. Therefore, to identify the metadata, the B+ tree is traversed from the inode, down the tree (e.g., top to bottom) to a particular node, where a FBN may be identified. Then only may the hash be used to do the block look up. The block look up process allowed by using fixed-width nodes is advantageously more efficient because the FBNs are known and used directly, without having to traverse the tree to identify the FBNs.

The use of variable-width direct blocks for part of the trees also advantageously provides for a low metadata to data ratio to represent files in some embodiments. Because the hybrid tree includes variable-width nodes, it also provides the ability to address variable size extents within the file. The hybrid tree format advantageously avoids some additional complexities introduced by a full-fledged B+ tree, without sacrificing storage efficiency. For example, implementing an efficient locking mechanism (e.g., to allow for parallel metadata and file operations) in a B+ tree is technically difficult and expensive. Yet, the locking mechanism may have significant effects in that errors in implementing the locking mechanism can lead to problems such as data inconsistency. Thus, a lock-free architecture that is advantageously enabled by using fixed-width nodes avoids the problems associated with implementing a locking mechanism for a B+ tree.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
   writing a file, as data blocks in an array of storage devices; and
   associating the data blocks with metadata related to at least one location in the array of storage devices for later access to the data blocks, including representing the file as a hierarchical data structure having a plurality of nodes, a first portion of nodes having a first span type and a second portion of nodes having a second span type;
   wherein the first span type comprises a fixed span type in which each of the nodes in a given level of the hierarchical data structure refers to data blocks of fixed size, and wherein the second span type comprises a variable span type in which each of the nodes in a given level of the hierarchical data structure refers to data blocks of different size, and
   wherein the span type of all nodes in a given level of hierarchical data structure is the same.

2. The method of claim 1, wherein the data structure comprises a tree, wherein first levels of the tree refer to metadata, and wherein second levels of the tree include data, the first levels being higher than the second levels.

3. The method of claim 1, wherein the first portion of nodes comprise intermediate storage blocks at a reference level and levels above the reference level, and wherein the second portion of nodes comprise intermediate storage blocks at levels below the reference level.

4. The method of claim 3, wherein the reference level comprises level two in the data structure, further in which the intermediate storage blocks at level two reference at least one intermediate storage block at level one, further in which the intermediate storage blocks at level one reference at least one identifier related to the data blocks, and further in which level zero includes the data blocks.

5. The method of claim 1, wherein the first portion of nodes and the second portion of nodes are associated with a group of values describing at least one of a first identifier related to a data block of a file, a second identifier related to a grouping of data blocks, and a length of the group of values.

6. The method of claim 1, wherein the first portion of nodes include pointers, each pointer referring to a virtual volume block number and a physical volume block number.

7. The method of claim 1, wherein the second portion of nodes include pointers, each pointer referring to a file block number and an extent identifier.

8. A network-based storage system comprising:
   a memory; and
   at least one processor, wherein
   the processor is configured to access instructions from the memory and perform the following operations:
      writing a file as data blocks in an array of storage devices;
      wherein writing the file is performed in a file system that uses nodes in a hierarchy, wherein nodes at a higher level of the hierarchy include the file information relating to the data blocks, and further wherein nodes in a lower level of the hierarchy include the data blocks;
      representing the file as a data structure within the file system, the data structure including a plurality of the nodes, a first portion of nodes having a first span type and a second portion of nodes having a second span type; and
      providing access to the file for file operations;
      wherein the first span type comprises a fixed span type in which each of the nodes in a given level of the hierarchy refers to data blocks of fixed size, and wherein the second span type comprises a variable span type in which each of the nodes in a given level of the hierarchy refers to data blocks of different size, and
      wherein the span type of all nodes in a given level of hierarchical data structure is the same.

9. The network-based storage system of claim 8, wherein the data structure comprises a tree, wherein first levels of the tree refer to metadata, and wherein second levels of the tree include data, the first levels being higher than the second levels.

10. The network-based storage system of claim 8, wherein the first portion of nodes comprise intermediate storage blocks at a reference level and levels above the reference level, and wherein the second portion of nodes comprise intermediate storage blocks at levels below the reference level.

11. The network-based storage system of claim 8, wherein the first portion of nodes and the second portion of nodes are associated with values describing a first identifier associated with the array of storage devices, a second identifier associated with a grouping of data blocks, and a length of the tuple.

12. The network-based storage system of claim 8, wherein the first portion of nodes include pointers, each pointer referring to a virtual volume block number and a physical volume block number.

13. The network-based storage system of claim 8, wherein the second portion of nodes include pointers, each pointer referring to a file block number and an extent identifier.

14. A computer program product having a non-transitory computer readable storage medium tangibly recording computer program logic for saving a file in a computer-based storage system, the computer program product comprising:
   code to write a plurality of data blocks associated with a file to an array of storage devices;
   code to represent the file as a data structure comprising a plurality of nodes in a hierarchy, a first portion of nodes having a first span type and a second portion of nodes having a second span type, the data structure associating the data blocks with file information relating to the data blocks; and
   code to provide access to the file for file operations;
   wherein the first span type comprises a fixed span type in which each of the nodes in a given level of the hierarchy refers to data blocks of fixed size, and wherein the second span type comprises a variable span type in which each of the nodes in a given level of the hierarchy refers to data blocks of different size, and
   wherein the span type of all nodes in a given level of hierarchical data structure is the same.

15. The computer program product of claim 14, wherein the data structure comprises a tree, wherein first levels of the tree refer to metadata, and wherein second levels of the tree include data, the first levels being higher than the second levels.

16. The computer program product of claim 14, wherein the first portion of nodes comprise data blocks at a reference level and levels above the reference level, and wherein the second portion of nodes comprise data blocks at levels below the reference level.

17. The computer program product of claim 14, wherein the first portion of nodes and the second portion of nodes are associated with a group of values describing a first identifier associated with the array of storage devices, a second identifier associated with a grouping of data blocks, and a length of the group of values.

18. The computer program product of claim 14, wherein the file information relating to the data blocks comprises metadata associated with the file.

19. The computer program product of claim 14, wherein the first portion of nodes include pointers, each pointer referring to a virtual volume block number and a physical volume block number.

20. The computer program product of claim 14, wherein the second portion of nodes include pointers, each pointer referring to a file block number and an extent identifier.

* * * * *